United States Patent
Schmitz

(10) Patent No.: US 11,298,626 B2
(45) Date of Patent: Apr. 12, 2022

(54) ACCESSORY CONNECTION SYSTEM, METHOD AND APPARATUS FOR A MODEL VEHICLE

(71) Applicant: TRAXXAS LP, McKinney, TX (US)

(72) Inventor: Scott Rollin Michael Schmitz, Lewisville, TX (US)

(73) Assignee: TRAXXAS, L.P., McKinney, TX (US)

( * ) Notice: Subject to any disclaimer, the term of this patent is extended or adjusted under 35 U.S.C. 154(b) by 0 days.

(21) Appl. No.: 16/343,386

(22) PCT Filed: Oct. 19, 2017

(86) PCT No.: PCT/US2017/057469
§ 371 (c)(1),
(2) Date: Apr. 18, 2019

(87) PCT Pub. No.: WO2018/075815
PCT Pub. Date: Apr. 26, 2018

(65) Prior Publication Data
US 2019/0314733 A1    Oct. 17, 2019

Related U.S. Application Data

(60) Provisional application No. 62/410,350, filed on Oct. 19, 2016.

(51) Int. Cl.
*A63H 17/32* (2006.01)
*A63H 17/34* (2006.01)
(Continued)

(52) U.S. Cl.
CPC .............. *A63H 17/32* (2013.01); *A63H 17/34* (2013.01); *A63H 29/22* (2013.01); *A63H 30/04* (2013.01)

(58) Field of Classification Search
CPC ...... A63H 17/00; A63H 17/002; A63H 17/12; A63H 17/26; A63H 17/264; A63H 17/28;
(Continued)

(56) References Cited

U.S. PATENT DOCUMENTS 4,219,962 A * 9/1980 Dankman .............. A63H 17/34
                                                        331/111
4,571,202 A * 2/1986 Diebold ............... A63H 33/003
                                                         446/90

(Continued)

FOREIGN PATENT DOCUMENTS

DE          20201453 U1     6/2002
WO        2018075815 A1     4/2018

OTHER PUBLICATIONS

International Search Report, by the ISA/EP, dated Jan. 17, 2018, re PCT/US2017/057469.
(Continued)

*Primary Examiner* — Joseph B Baldori
(74) *Attorney, Agent, or Firm* — Daryl R. Wright; Greg Carr

(57) ABSTRACT

An apparatus, system, and method for connecting an auxiliary device to a model vehicle are provided. The apparatus includes an accessory port connected to an electronic speed controller and an accessory connector connected to the auxiliary device. The system further includes a battery and accessory port connected to an electronic speed controller. An accessory connector connected to the auxiliary device is designed to connect to the accessory port. The electronic speed controller provides control to the auxiliary device. The method includes providing an electronic speed controller connected to an accessory port and connecting an accessory connector to the accessory port. The accessory connector is further connected to the auxiliary device. The method fur-
(Continued)

ther includes attaching the auxiliary device to the model vehicle and controlling the auxiliary device via the electronic speed controller.

16 Claims, 15 Drawing Sheets

(51) Int. Cl.
*A63H 29/22* (2006.01)
*A63H 30/04* (2006.01)

(58) Field of Classification Search
CPC ........ A63H 17/32; A63H 17/34; A63H 29/22; A63H 30/00; A63H 30/02; A63H 30/04
USPC ....... 446/436, 438, 439, 441, 442, 454, 456, 446/457
See application file for complete search history.

(56) References Cited

U.S. PATENT DOCUMENTS

| | | | | |
|---|---|---|---|---|
| 4,732,049 | A * | 3/1988 | Beny | A63H 29/22 446/156 |
| 6,083,104 | A | 7/2000 | Choi | |
| 7,553,211 | B1 * | 6/2009 | DeAngelis | A63H 17/00 446/454 |
| 7,717,767 | B2 * | 5/2010 | Amadio | A63H 17/262 446/95 |
| 8,353,737 | B2 * | 1/2013 | Sofman | A63H 17/32 446/456 |
| 8,571,781 | B2 * | 10/2013 | Bernstein | G05D 1/0088 701/99 |
| 9,437,101 | B2 * | 9/2016 | Rohr | G08C 17/02 |
| 9,518,821 | B2 * | 12/2016 | Malay | H04W 4/025 |
| 9,975,056 | B2 * | 5/2018 | Kawamura | G07C 5/008 |
| 2004/0009734 | A1 * | 1/2004 | Needham | A63H 17/002 446/94 |
| 2004/0082268 | A1 | 4/2004 | Choi | |
| 2006/0211328 | A1 * | 9/2006 | del Castillo | A63H 30/04 446/6 |
| 2012/0050198 | A1 * | 3/2012 | Cannon | A63F 13/06 345/173 |
| 2015/0109110 | A1 * | 4/2015 | Wu | A63H 30/02 340/12.54 |
| 2016/0129355 | A1 | 5/2016 | Erhart | |
| 2018/0327090 | A1 * | 11/2018 | De Chassey | B64C 39/024 |

OTHER PUBLICATIONS

Written Opinion, by the ISA/EP, dated Jan. 17, 2018, re PCT/US2017/057469.
Anonymous; "Auxiliary port on the VXL-3s;" Aug. 14, 2011; https://forums.traxxas.com/showthread.php?8923400-auziliary-port-on-the-VXL-3s.

* cited by examiner

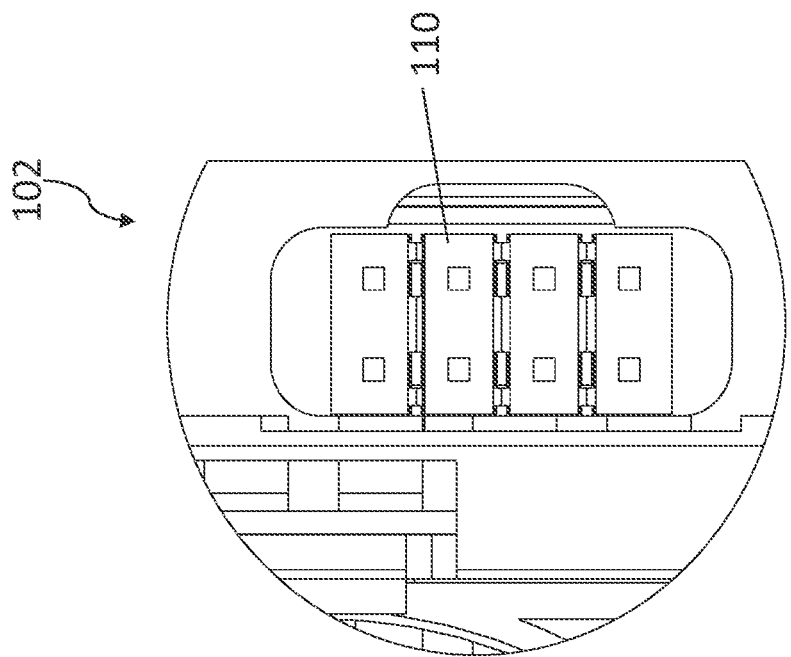
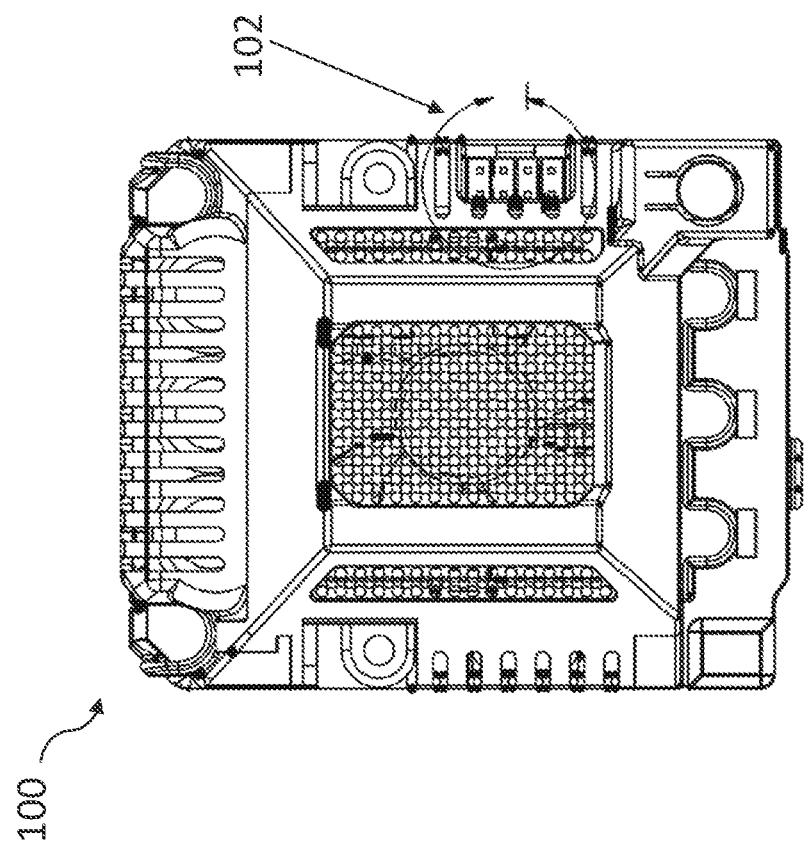
FIG. 3B
FIG. 3A

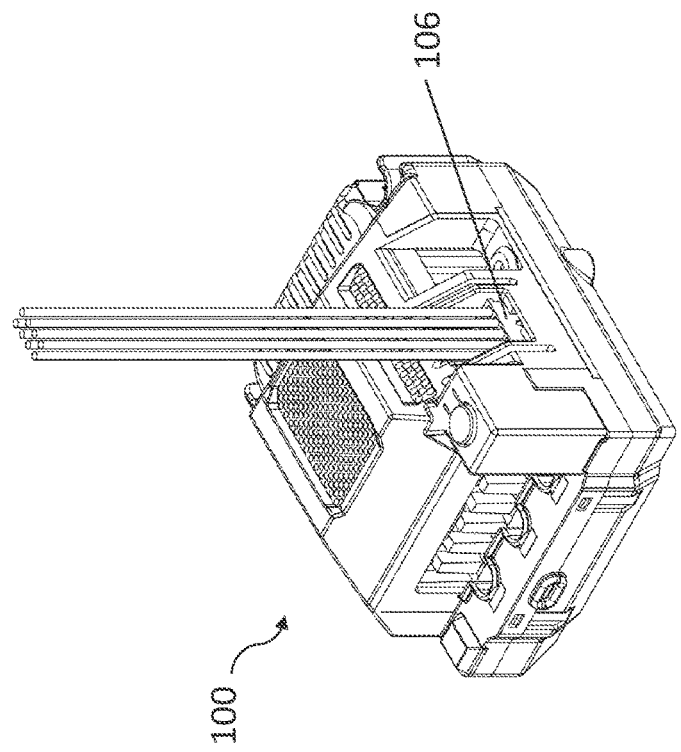
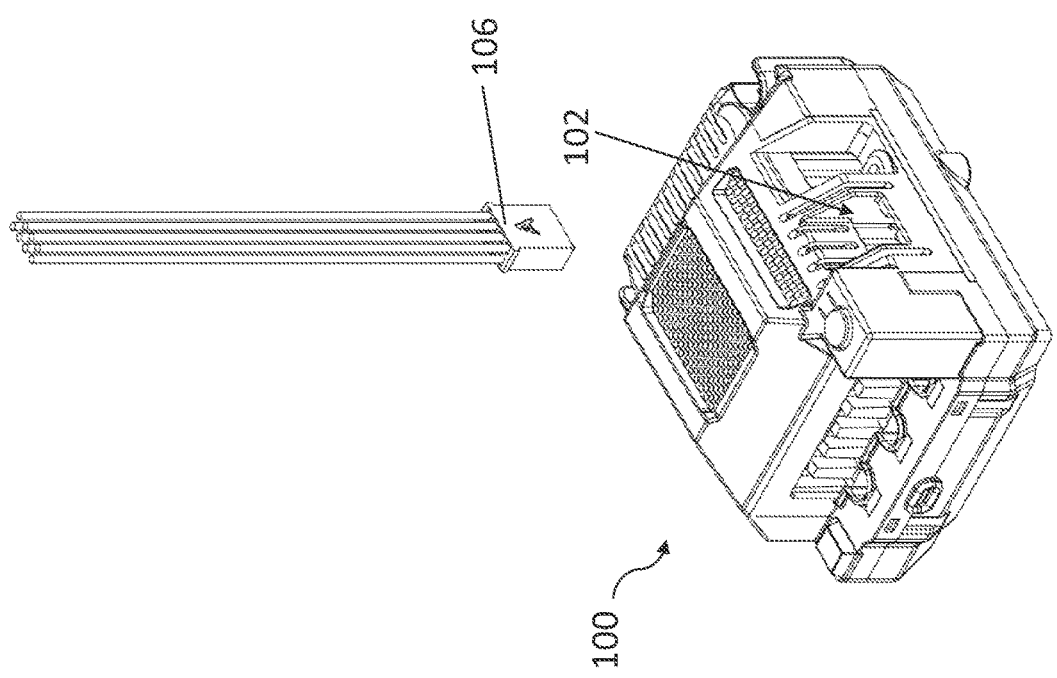
FIG. 5B
FIG. 5A

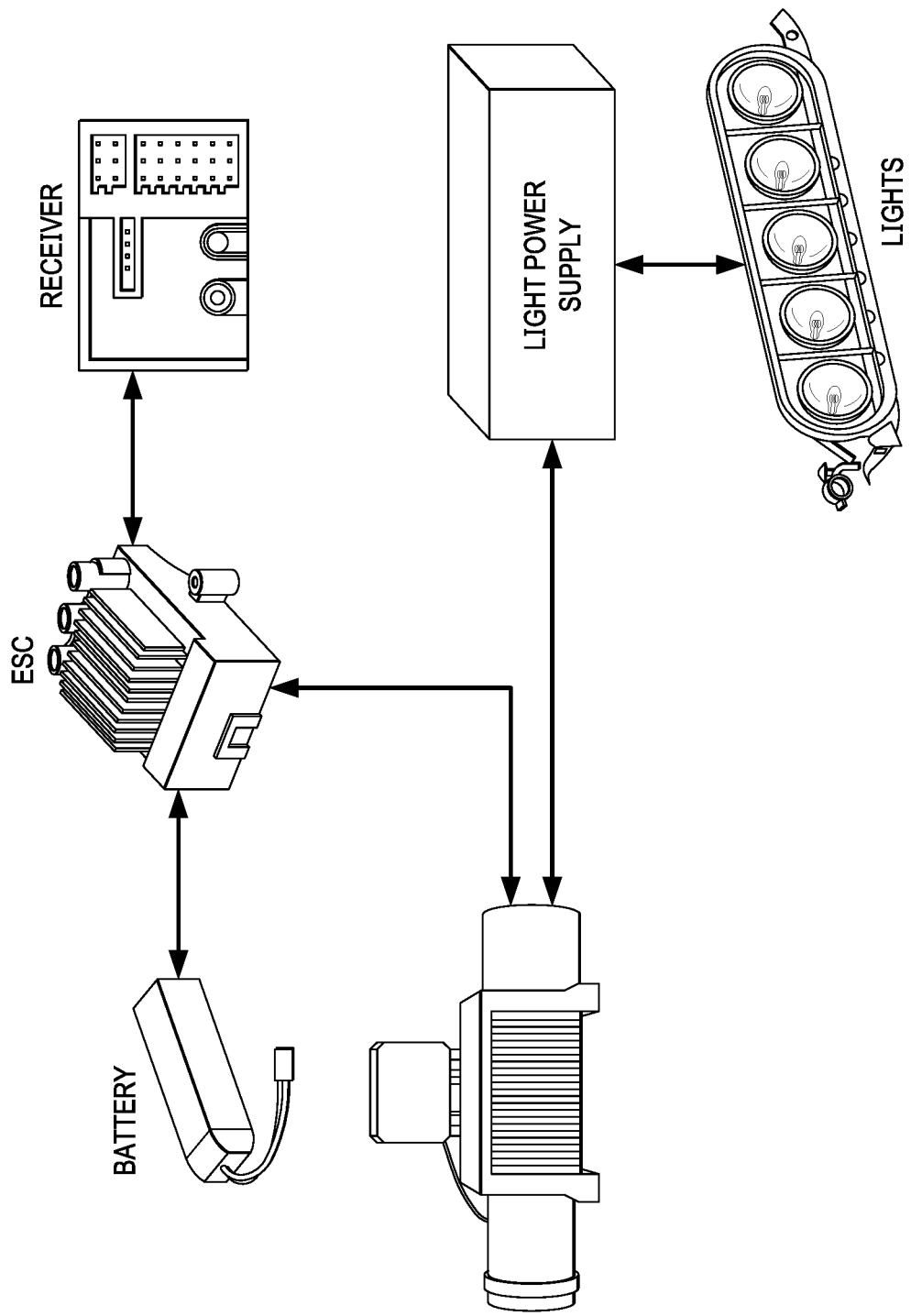

ACCESSORY CONNECTION SYSTEM, METHOD AND APPARATUS FOR A MODEL VEHICLE

RELATED APPLICATIONS

This application claims the benefit of a related U.S. Provisional Application Ser. No. 62/410,350, filed Oct. 19, 2016, entitled "ACCESSORY CONNECTION METHOD AND APPARATUS," to Scott Rollin Michael Schmitz et al., the disclosure of which is incorporated by reference herein in its entirety.

BACKGROUND

The following descriptions and examples are not admitted to be prior art by virtue of their inclusion in this section.

Remote Controlled vehicles may mimic the design, style, and handling of a full-sized vehicles on which they are based. While these vehicles loosely emulate the physical appearance of the full-sized original, remote controlled vehicles do not typically provide support for additional customizations. There may be many other types of devices consumers may wish to connect to their remote controlled vehicle. Working lights, winches, or a horn are examples of customizations that consumers may find appealing. In addition to connecting these customizations to the remote controlled model vehicle, it may also be desirable to consumers to have control of these connected devices including turning the device on or off, adjusting the specific behavior of the device, or to have the model vehicle's electronics control the device in an automatic manner. It is also desirable to have such features and customizations easily accessible without detailed technical skills needed to make the connections to the electrical system of the model vehicle.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In accordance with an embodiment, an apparatus for connecting an auxiliary device to a model vehicle comprises an accessory port coupled with the model vehicle's electronic speed controller and an accessory connector coupled with the auxiliary device. The auxiliary device is controlled via the electronic speed controller.

In accordance with another embodiment, a system for connecting an auxiliary device to a model vehicle comprises an electronic speed controller electrically coupled with a battery and an accessory port electrically coupled with the electronic speed controller. An accessory connector coupled with the auxiliary device is configured to be connected to the electronic speed controller via the accessory port and the electronic speed controller is configured to provide control to the auxiliary device.

In accordance with still another embodiment, a method for implementing an auxiliary device to a model vehicle comprises providing an electronic speed controller coupled to an accessory port and coupling an accessory connector to the accessory port wherein the accessory connector is further coupled to the auxiliary device. In addition, the method further comprises attaching the auxiliary device to the model vehicle and controlling the auxiliary device via the electronic speed controller.

Other or alternative features will become apparent from the following description, from the drawings, and from the claims.

BRIEF DESCRIPTION OF DRAWINGS

Certain embodiments will hereafter be described with reference to the accompanying drawings, wherein like reference numerals denote like elements. It should be understood, however, that the accompanying drawings illustrate only the various implementations described herein and are not meant to limit the scope of various technologies described herein. The drawings are as follows:

FIG. 3A shows a top view of the electronic speed controller and the accessory port;

FIG. 3B shows a close up view of the accessory port;

FIGS. 5A and 5B show an accessory connector being inserted into the accessory port in a first position;

FIG. 15 shows the accessory being connected to the model vehicle through the ESC.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning electronic communications and electro-magnetic signaling techniques and the like, have been omitted inasmuch as such details are not considered necessary to obtain a complete understanding of the present invention, and are considered to be within the understanding of persons of ordinary skill in the relevant art.

The accessory port 102 and accessory connector 106 embodiments described herein present several features, functions, and characteristics for improving the remote controlled model vehicle experience. Additionally, methods for supplying power and control to an accessory 108 connected to a remote controlled model vehicle having some or all of the features, functions, and characteristics of the accessory port and accessory connector embodiments described herein are provided.

Figure 14:
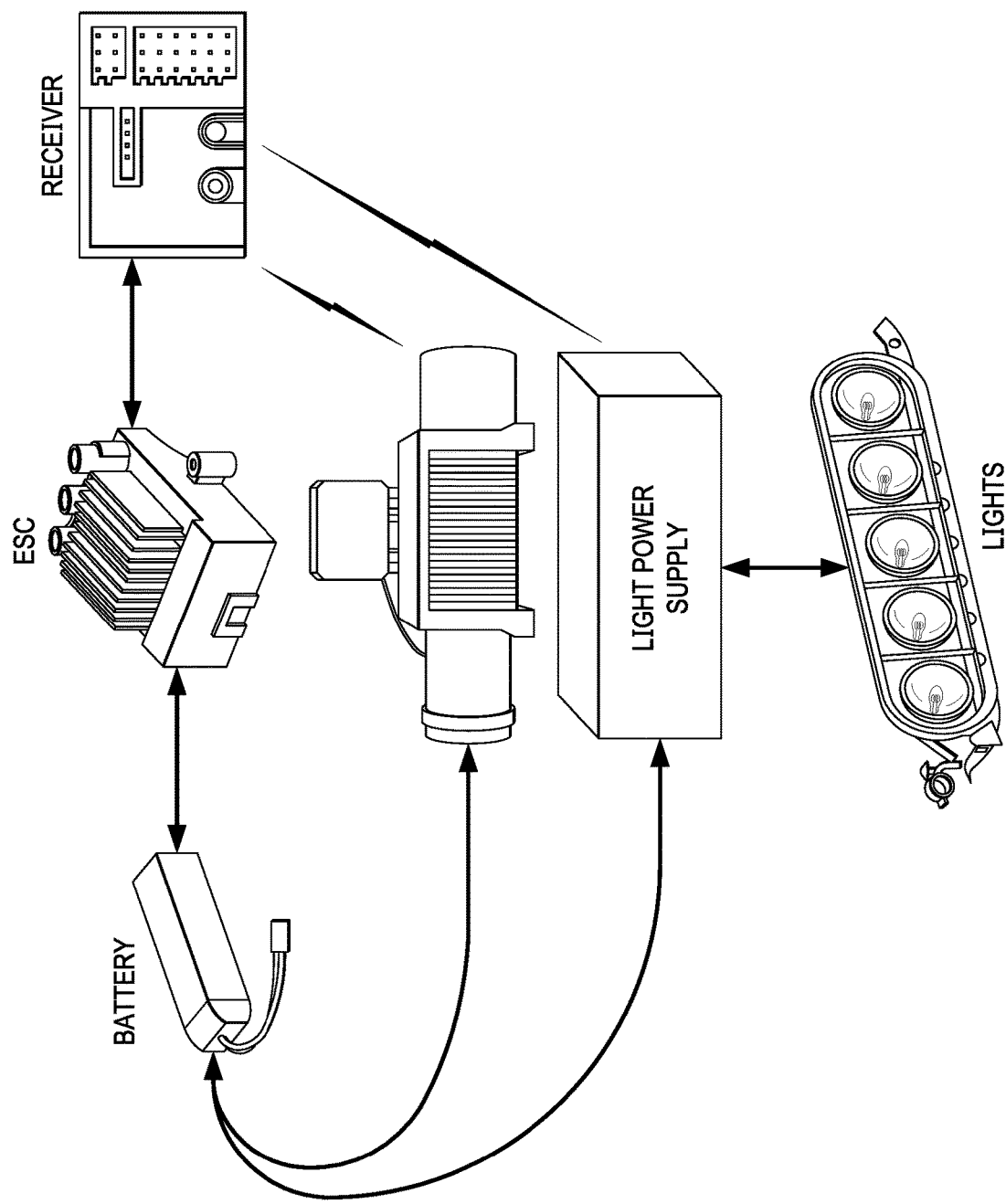
FIG. 14 shows traditional wired connections for connecting accessories to the model vehicle.

Adding accessories to model vehicles is a popular facet of remote controlled hobbies. However, the need of electrical connections that typically accompany the addition of said accessories may be challenging to consumers. As shown in FIG. 14, traditionally, when connecting the accessory 108 to a model vehicle, wires are needed to connect the accessory 108 to both the battery of the model vehicle the receiver in order to provide both power and control. In some instances, accessories may further need to be connected to a separate power supply 110 which requires additional wiring and connections to be made. As such, improper installation by the consumer may lead to costly errors.

The accessory port 102 and accessory connector 106 described herein may provide a simple connection point for connecting accessories to the model vehicle. The accessory may be connected through "plug and play" customization. The accessory port 102 and the accessory connector 106 may provide all the needed voltages and signals required for operating and controlling the connected accessory. As shown in FIG. 14, the accessory port 102 may be integrated with the electronic speed controller 100 of the model vehicle to reduce the need for additional wiring by the consumer which may lead to additional points of failures.

Examples of accessories that may be connected using the accessory port 102 and accessory connector 106 embodiments may include but is not limited to light modules, winches, servos, 6 axis accelerometers/gyros such as wheelie control and rollover protection, sound simulation devices, multi-output auxiliary servo drivers, DC auxiliary motor control devices and the like.

Electrical Connector

The accessory port 102 and accessory connector 106 embodiments described may be suitable for use with remote controlled model vehicles typically having a radio, a motor Electronic Speed Controller (ESC 100) 100, and a steering servo. The accessory port 102 may be configured as part of the ESC 100 to provide the connected accessory access to power from the battery of the model vehicle. The connected accessory may also access the model vehicle's regulated power source, the Battery Eliminator Circuit (BEC) through the ESC 100.

Figure 1:
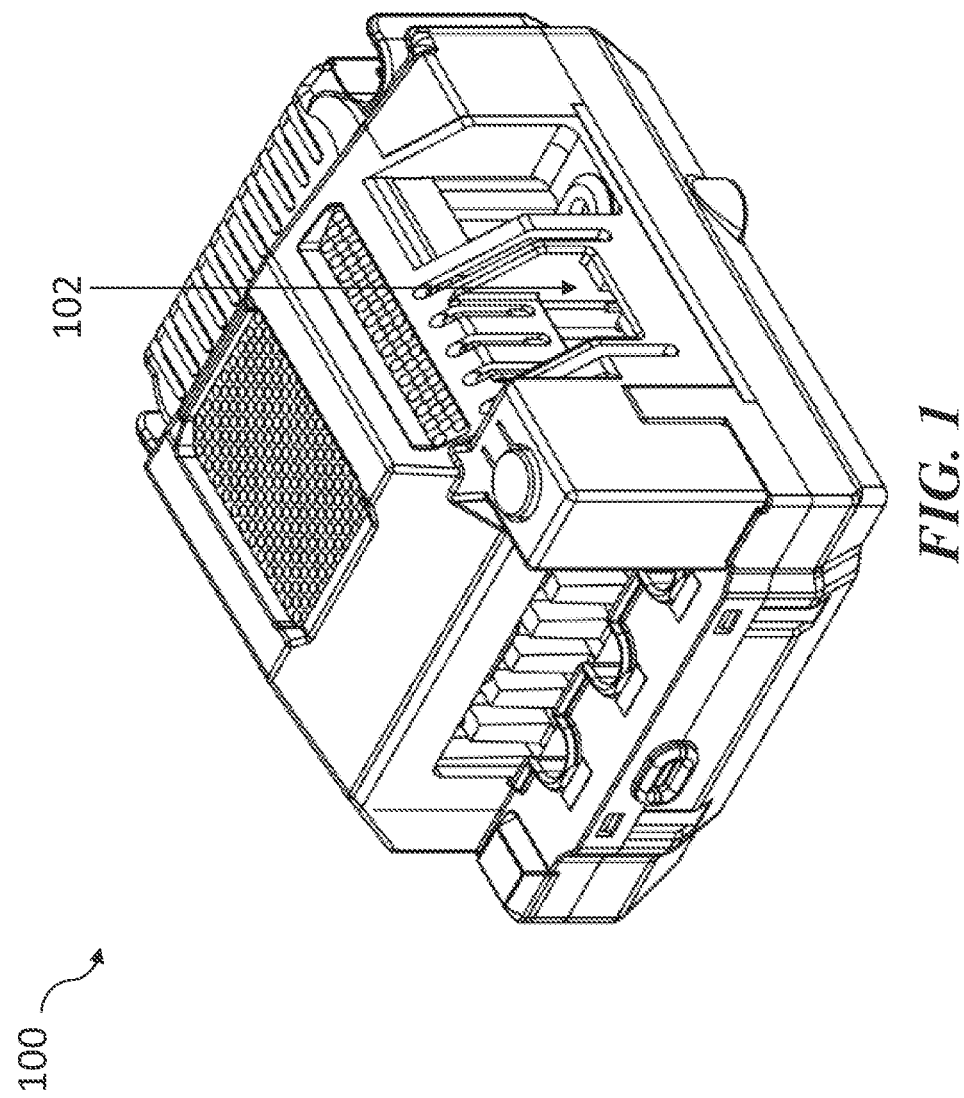
FIGS. 1 and 2 show an electronic speed controller for a model vehicle with an accessory port.
Figure 2:
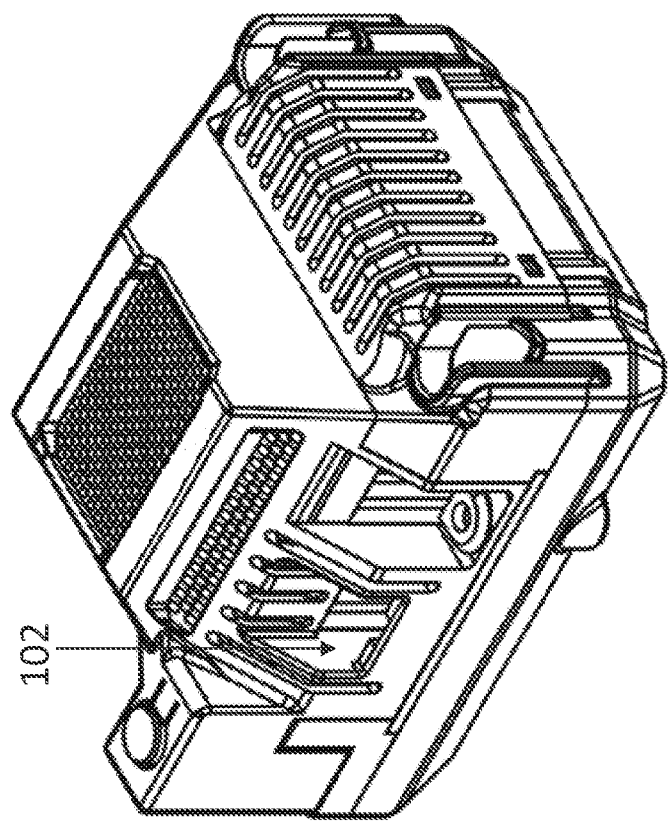

Turning to FIGS. 1 and 2, in an embodiment, an exemplary ESC 100 for a remote controlled model vehicle is shown comprising an accessory port 102 for connecting an accessory to the model vehicle. The accessory port 102 in the ESC 100 may be formed to receive an accessory connector 106 extending from and connected to the accessory. In the example shown, the accessory port 102 is of a rectangular shaped depression where the accessory connector 106 may be inserted to contact the electrical circuits of the ESC 100. Various other shapes for the accessory may be used. The shape of the accessory port 102 may be substantially similar to the shape of the accessory connector 106. The accessory port 102 may be formed in a top surface of the ESC 100 to allow easy access for the accessory connector 106 to be inserted into the accessory port 102. Alternatively, the accessory port 102 may be formed in any part of the ESC 100 depending on the spacing and design within the model vehicle. The ESC 100 may also be configured to comprise more than one accessory port 102 to connect more than one accessory to the model vehicle.

Figure 4B:
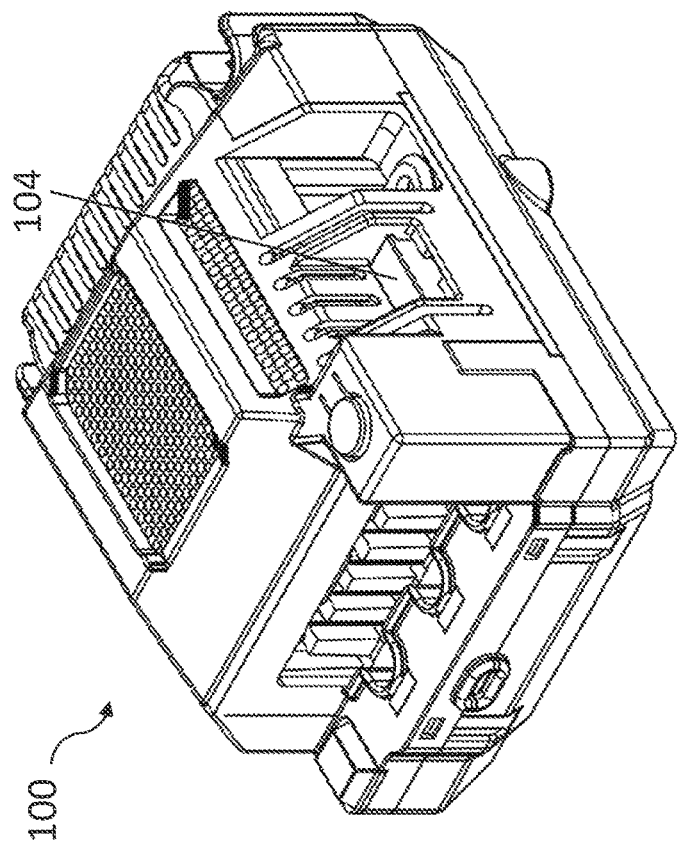
FIG. 4B shows the auxiliary port cover inserted into the accessory port.
Figure 4A:
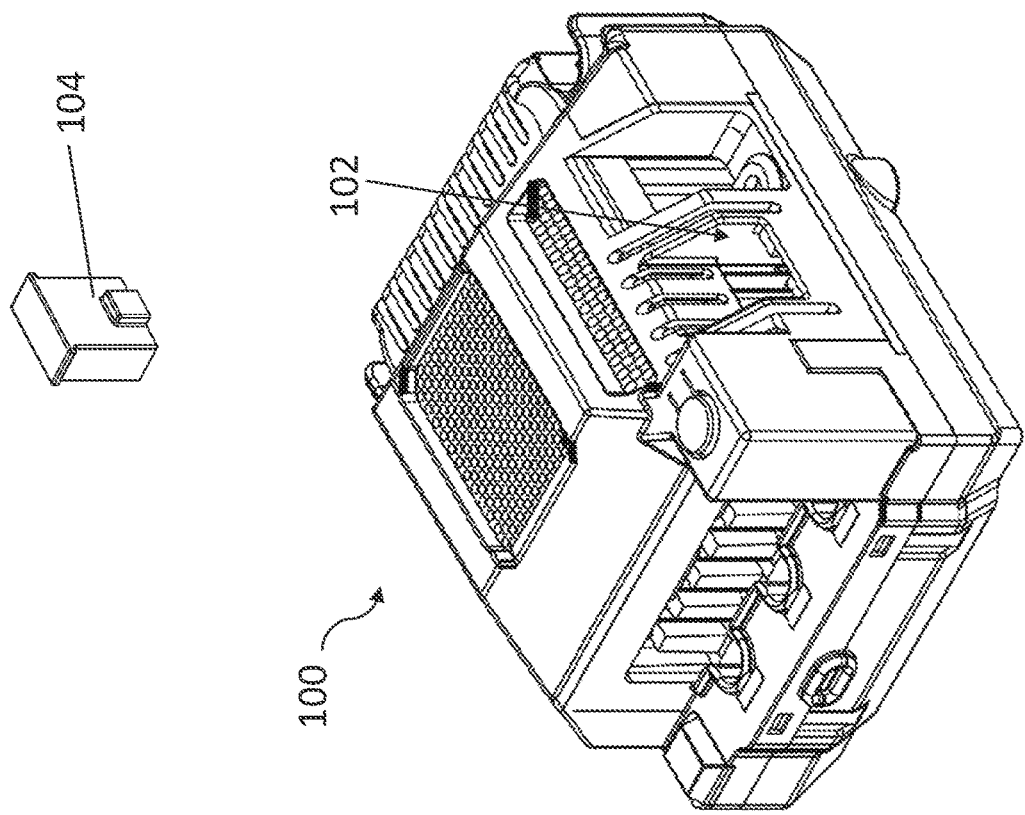
FIG. 4A shows the electronic speed controller with the accessory port and an auxiliary port cover.

FIGS. 3A and 3B show an exemplary top view of the ESC 100 and the accessory port 102. FIG. 3B shows a close up view of the accessory port 102. In the embodiment shown, the accessory port may comprise an 8-pin female connector 110 configured to receive an 8-pin male connector in the accessory connector 106. In addition to receiving the accessory connector 106 from the accessory, the accessory port 102 may be configured to also receive an auxiliary port cover 104 when no accessory is being connected to the model vehicle. The auxiliary port cover 104 may be substantially the same shape as the accessory port 102. FIGS. 4A and 4B show the auxiliary port cover 104 being inserted into the accessory port 102 when the accessory port 102 is not in use. The auxiliary port cover 104 may protect the accessory port 102 from dust and debris buildup that may later interrupt the connection when an accessory is connected.

Figure 7:
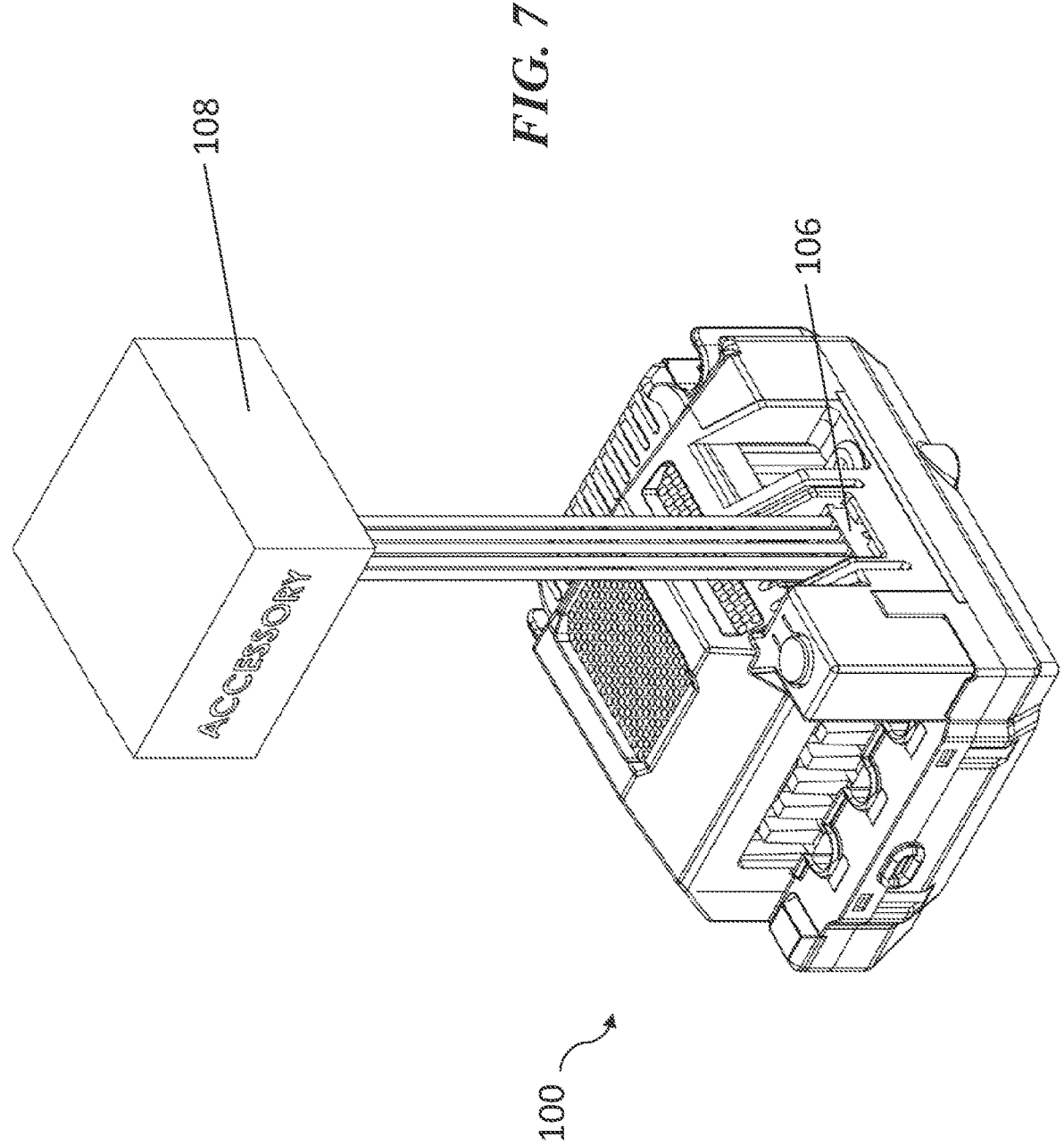
FIG. 7 shows an accessory connected to the electronic speed controller.

As shown in FIG. 7, the accessory connector 106 may be connected to the accessory by a wire such that inserting the accessory connector 106 into the accessory port 102 may be the only connection necessary to connect the accessory to the model vehicle. This may allow for the "plug and play" customization of the model vehicle. FIG. 5A shows the accessory connector 106 at the end a wire being lined up for connection with the accessory port 102. The accessory connector 106 may then be inserted into the accessory port 102 as shown in FIG. 5B to connect the accessory to the ESC 100.

Figure 6A:
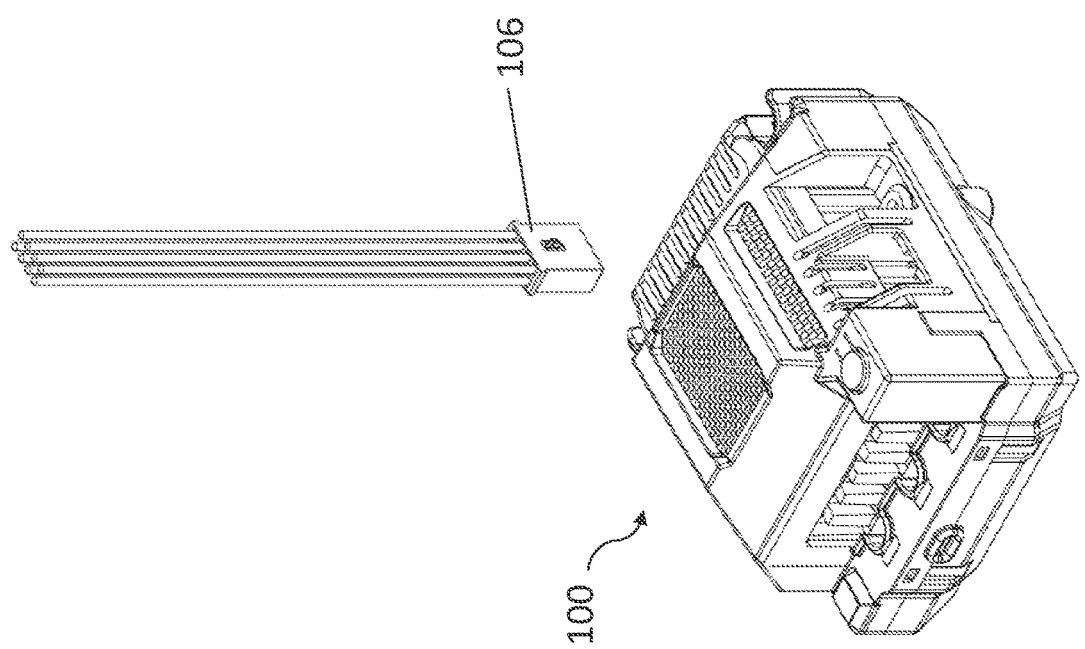
FIGS. 6A and 6B show the accessory connector being inserted into the accessory port in a second position.
Figure 6B:
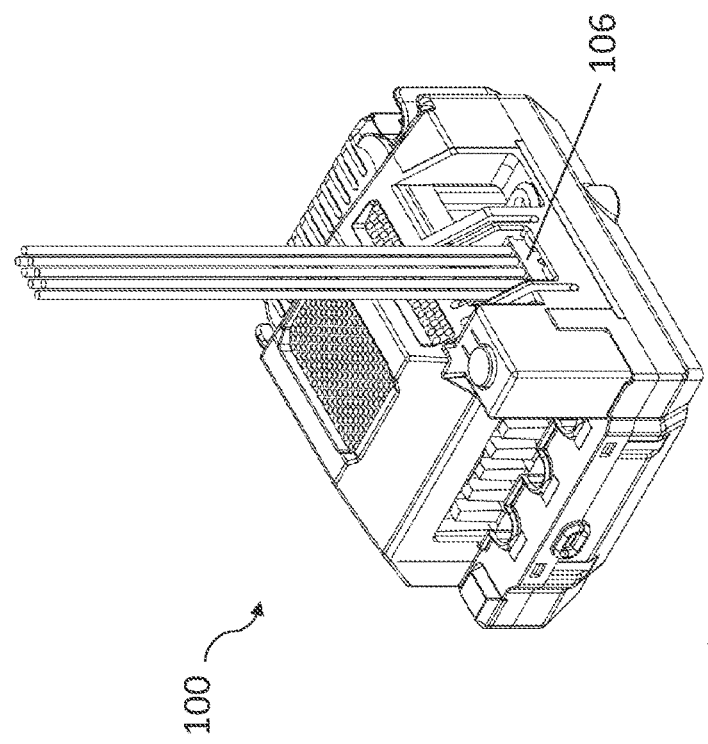

In the instance that a user may inadvertently force the accessory connector 106 into the accessory port 102 incorrectly; the accessory port 102 may be configured to receive the accessory connector 106 in both a correct and an incorrect position without damage to the circuitry. FIGS. 6A and 6B show the accessory port 102 capable of receiving the accessory connector 106 when inserted in either a correct orientation or when inadvertently inserted in an incorrect orientation. Alternatively, the accessory port 102 and accessory connector 106 may be shaped like a trapezoid such that the accessory connector 106 may only fit into the accessory port 102 in one orientation.

Figure 13B:
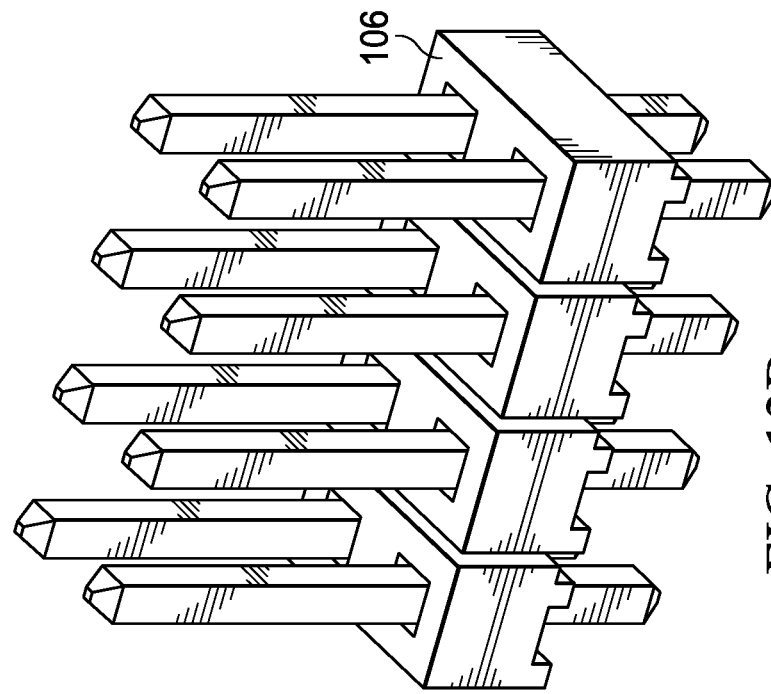
FIGS. 13A and 13B show exemplary connectors used for the accessory port and the accessory connector.
Figure 13A:
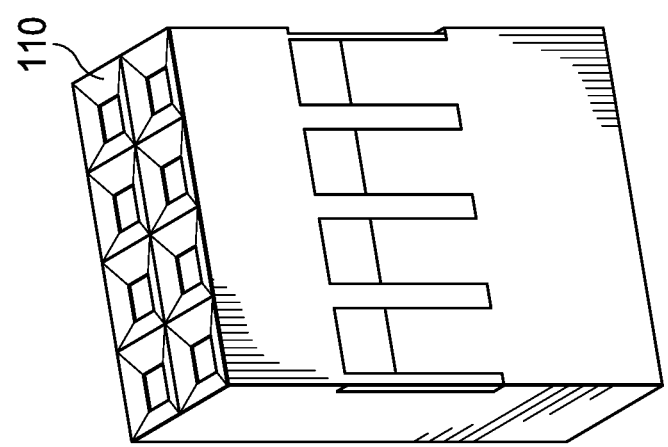

Exemplary connectors of the accessory port 102 and accessory connector 106 are shown in FIGS. 13A and 13B. FIG. 13A shows the female connector corresponding to the accessory port 102 shown in FIGS. 3A and 3B. FIG. 13B shows the male connector corresponding to the accessory connector 106 that may mate with the accessory port 102 to connect the accessory to the ESC 100 of the model vehicle.

Additionally, or alternatively, in an embodiment, the accessory port 102 may comprise an internal user replicable fuse to protect the electrical circuit of the model vehicle should damage to the wiring or connected accessory 108 occur. The connection to the BEC power source may incorporate an overvoltage protection circuit configured to blow the fuse if the battery power and the BEC power are shorted together.

Electrical Connectivity and Device Control

Figure 8:
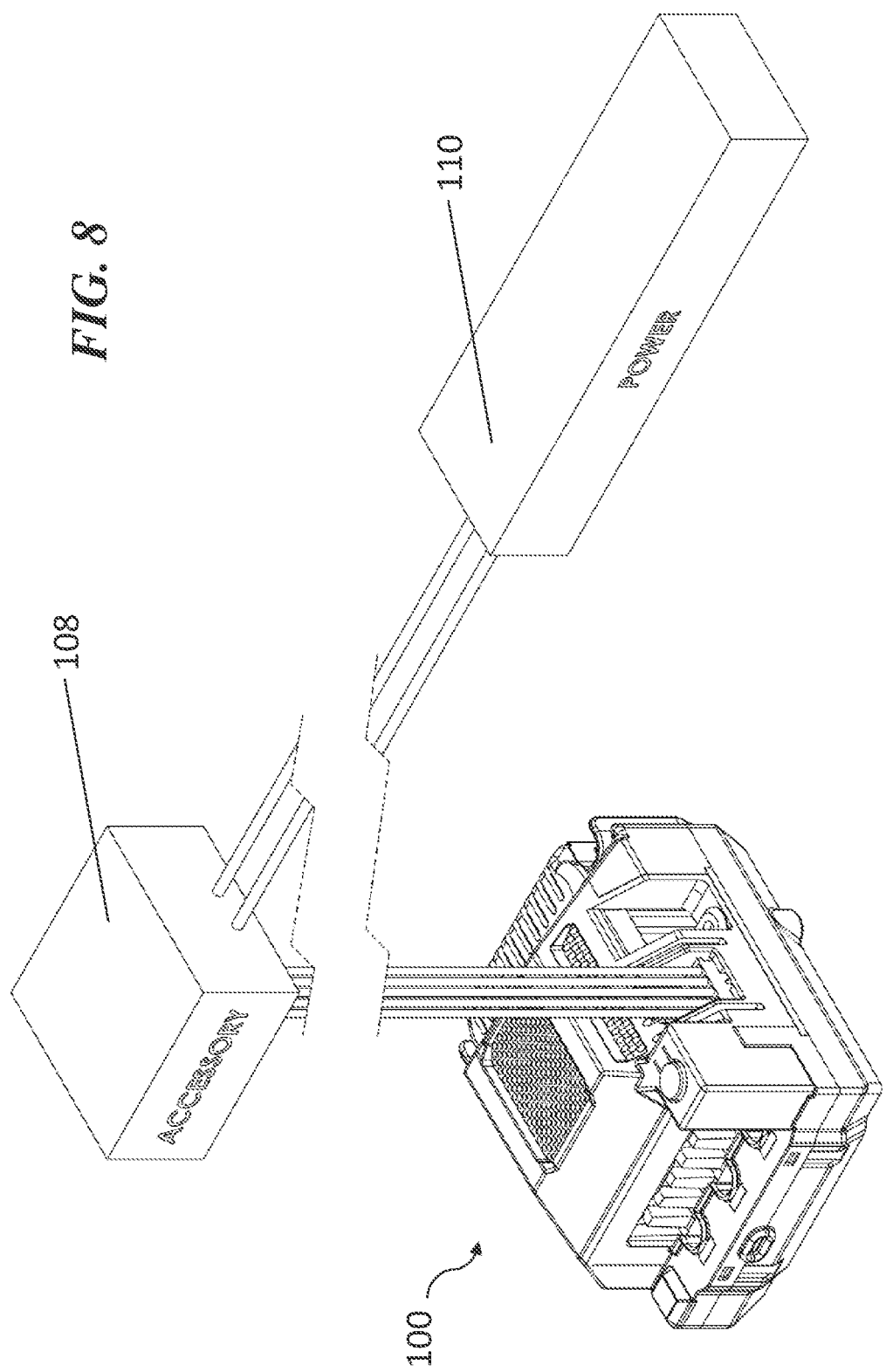
FIG. 8 shows an alternative power source not being required for the accessory being connected to the electronic speed controller.
Figure 10:
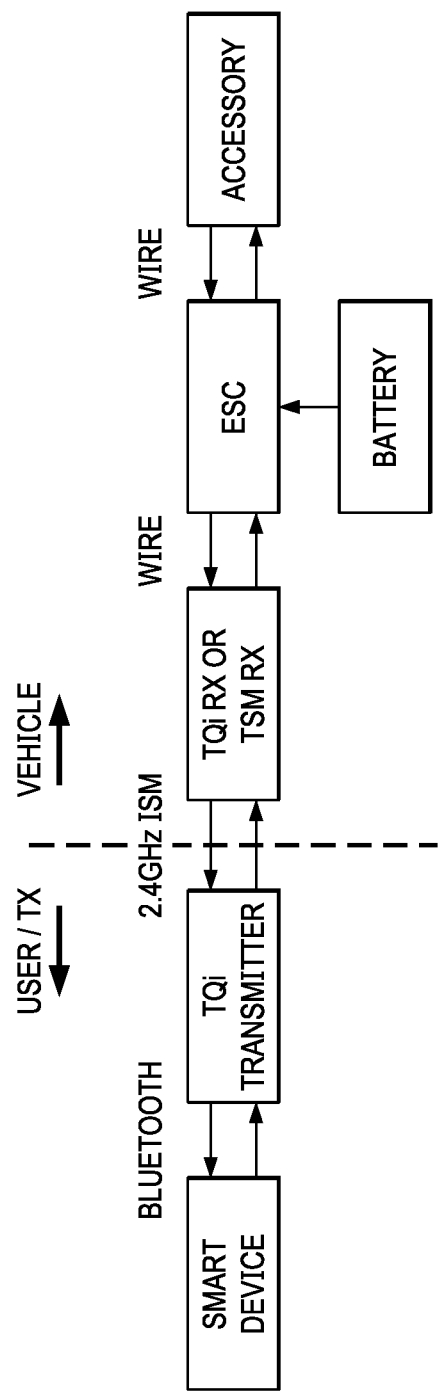
FIG. 10 shows a schematic diagram of the model vehicle with the connected accessory in communication with a Smart Device.
Figure 12:
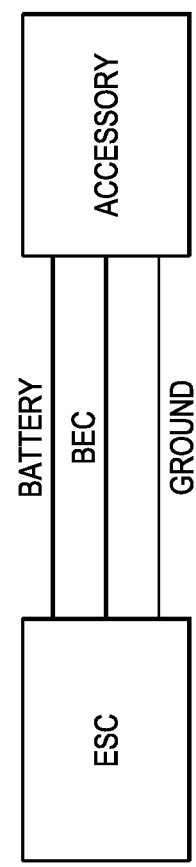
FIG. 12 shows a schematic diagram of power routed between the ESC to the connected accessory.

Different connected accessories may have different needs for both control and connections to electrical power. Turning to FIG. 8, some exemplary accessories may only use the accessory port 102 to provide power for operation. The ESC 100 may provide enough power to the connected accessory 108 such that a separate or additional power supply 110 may not be needed to be separately connected to the accessory. As shown in FIGS. 10 and 12, the single connection between the accessory and the ESC 100 of the model vehicle may be suitable for providing the connected accessory 108 the necessary power for operation. Having both the battery and the accessory connected to the ESC 100 may allow the ESC 100 to route power from the battery to the connected accessory 108, as shown in FIG. 10. Alternatively, if the connected accessory 108 requires more power than may be provided by the ESC 100, the accessory 108 may be configured with a separate battery supply or bypass the ESC 100 and instead directly connect to the model vehicle battery.

Alternatively, other accessories may use the accessory port 102 to provide both power and control, or control alone. The accessory port 102 and accessory connector 106 embodiments described herein may be configured to provide control over the connected accessory 108. The signals needed to remotely control the connected accessory 108 may be incorporated into the accessory connector 106. The connected accessory 108 may be configured to both transmit and receive signals from the user.

The accessory connector 106 may further comprise a computer interface to be connected to the ESC 100's internal microcontroller. The computer interface may provide control over the connected device either autonomously using the ESC 100's microcontroller or via commands sent by the user from the radio control transmitter or Smart Device. The radio control transmitter may be in wireless communication with the Receiver in the model vehicle. The Receiver may be connected to the ESC 100, and therefore connected to the connected accessory 108 through the accessory port 102 and accessory connector 106 connection.

The accessory port 102 and accessory connector 106 embodiments described herein may also be configured to be suitable for use with connecting several different accessories to the model vehicle. The accessory port 102 communication protocol may provide the model vehicle the ability to support multiple accessories at the same time. Each of the accessories connected to the ESC 100 may communicate a unique identification (UID) message to the ESC 100's microcontroller. The UID message may then be communicated to other devices in the control chain, including but not limited to the receiver, the transmitter, and a smart device. The UID message may comprise at least one of a serial number of the connected accessory 108 or a device type identifier. The serial number may be unique to all devices of each type. This may allow for more than one accessory of a particular type to be connected. For example, a consumer may connect two winches to the same model vehicle. The device type identifier may be used to configure control of each of the connected devices.

Additionally, or alternatively, in an embodiment, the accessory port 102 and the accessory connector 106 described herein may be implemented with components in a control chain for automatic configuration and control of the connected accessory 108. The integrated control signals of the accessory port 102 for connected accessories may give the model vehicle's electronics or the user control over the operations of the accessory 108.

Figure 9:
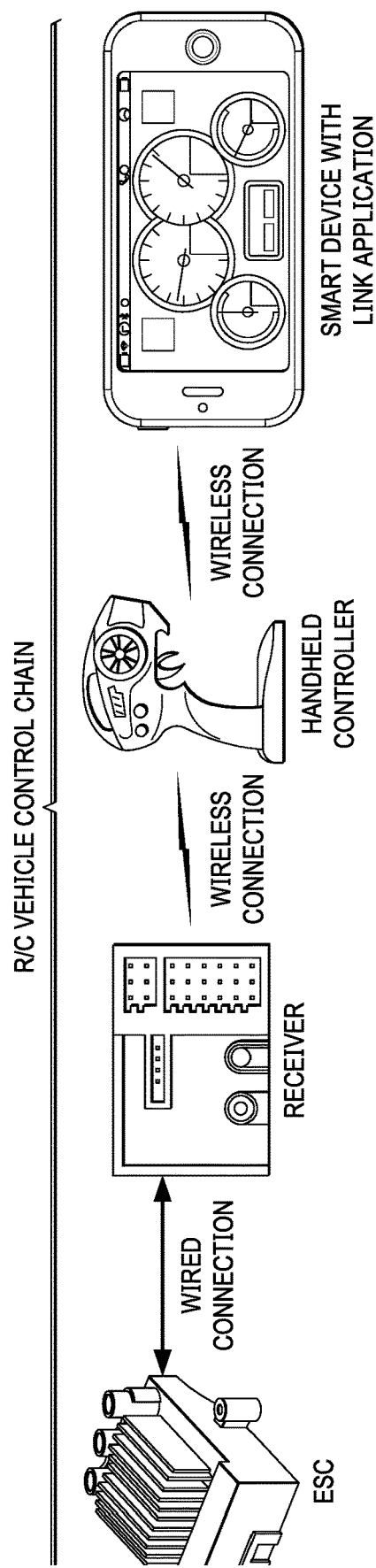
FIG. 9 shows various connected components for the model vehicle control chain.

As shown in FIG. 9, the control chain may comprise the ESC 100, a Receiver, a handheld controller, and a Smart Device. The ESC 100 may be connected to the Receiver by a wired connection. The Receiver may be wirelessly connected to the Handheld Controller. The Handheld Controller may be wirelessly connected to a Smart Device with a LINK application. The control chain may identify the functionality of each the connected accessory 108. The control chain may also configure all components of the control chain to work with each of the connected accessory 108. The LINK application on the Smart Device may automatically display to the user the connection status of the connected accessory 108. The LINK application may also provide the user a set of control and configuration options unique to the connected accessory 108.

The components in the control chain described herein may be implemented such that communication is allowed between the user and the connected accessory 108. FIG. 10 shows an exemplary schematic diagram of the communication and connection between each of the components in the control chain when an accessory is connected to the ESC 100. The battery is connected to the ESC 100 to provide the model vehicle and accessory power. The accessory 108 connected to the ESC 100 may transmit and receiving signals to the ESC 100, which in turn may transmit and receive signals to the connected Receiver. In the example shown, the Receiver may comprise the TQi RX or TSM RX firmware. The Receiver comprising the TQi RX or TSM RX may actually operate as a transceiver capable of wirelessly transmitting and receiving signals with a handheld controller comprising the TQi Transmitter. The handheld controller comprising the TQi Transmitter may optionally be wirelessly connected to a Smart Device. The user may control and send commands to the model vehicle using the handheld controller or Smart Device. The user may also receive status indications and updates from the model vehicle on the handheld controller or Smart Device.

Figure 11:
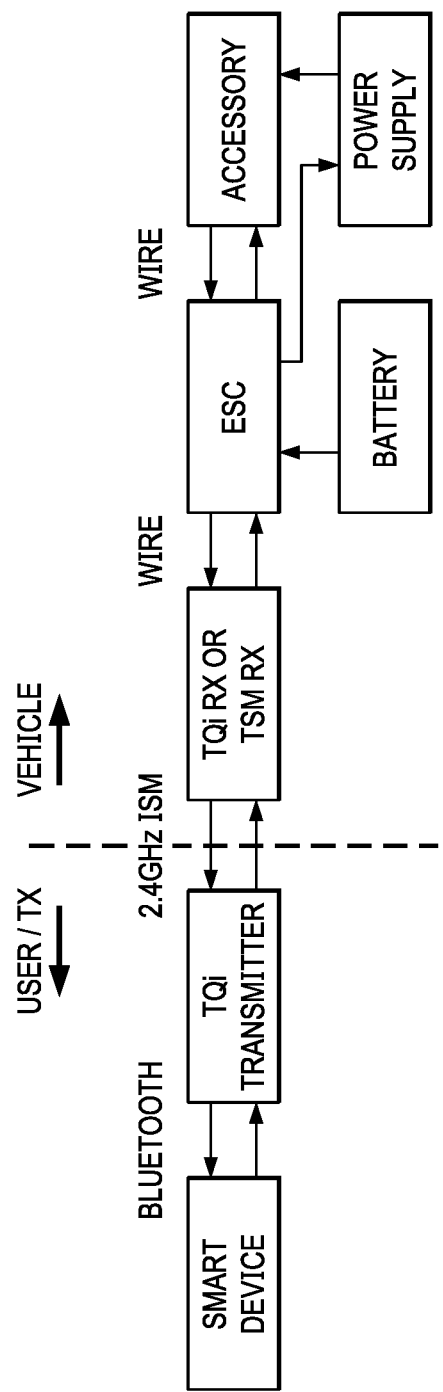
FIG. 11 shows a schematic diagram of the model vehicle with the connected accessory and an additional supply, in communication with a Smart Device.

Alternatively, FIG. 11 shows a schematic diagram of the communication and connection between the components of the control chain when the connected accessory 108 requires a separate power supply 110. The ESC 100 may therefore be connected to the additional power supply 110 which in turn is connected to the accessory 108. The accessory 108 may then be powered by both the additional power supply 110 as well as the battery connected to the ESC 100.

The accessory port 102 and accessory connector 106 embodiments may be configured such that the connected accessory 108 may report data back to the model vehicle's electronics, the handheld controller, and the Smart Device. The control protocol of accessory port 102 may be configured to allow for basic functionality of the connected accessory 108 such as turning the accessory 108 on and off, as well as various automated operations that may be triggered from any device in the control chain.

As an example of control over accessory headlights connected to the model vehicle using the accessory port 102 and accessory connector 106, the accessory headlights may be configured such that the user may turn the head lights on and off or change the intensity or color of the lights. The headlights may also operate as brake lights in response to the vehicle's electronics such as illuminating automatically when the user commands the model vehicle to brake.

Having thus described the present invention by reference to certain of its exemplary embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of exemplary embodiments. Accordingly, it is appropriate that any claims supported by this description be construed broadly. It is the express intention of the applicants not to invoke 35 U.S.C. § 112, paragraph 6 for any limitations of any of the claims herein, except for those in which the claim expressly uses the words 'means for' together with an associated function.

We claim:

1. An electronic speed controller (ESC) for a model vehicle comprising:
   a battery eliminator circuit (BEC) configured to provide regulated power from a model vehicle battery comprising a model vehicle battery voltage;
   an accessory port configured to electrically couple to the regulated power produced by the BEC;
   wherein an accessory device is electrically coupled to the ESC via an accessory connector electrically coupled to the accessory device and the accessory port;
   wherein the accessory connector provides at least one of an accessory voltage or an accessory signal for operation of the accessory device; and
   wherein the accessory voltage or the accessory signal provided from the regulated power produced by the BEC is different than the model vehicle battery voltage.

2. The ESC according to claim 1, wherein the accessory device is autonomously controlled via the accessory connector.

3. The ESC according to claim 1, wherein the accessory device is operationally controlled via signals received from a remotely located transmitter.

4. The ESC according to claim 3 wherein the remotely located transmitter is a Smart Device.

5. The ESC according to claim 3 wherein the remotely located transmitter is a handheld controller.

6. The ESC according to claim 1, wherein the accessory device further comprises two or more auxiliary devices.

7. The ESC according to claim 1, wherein the accessory device comprises lights.

8. The ESC according to claim 1, wherein the accessory device comprises a winch.

9. The ESC according to claim 1 wherein the accessory device comprises brake lights.

10. A model vehicle comprising:
    a connection system for connecting an accessory device to the model vehicle, the connection system comprising:
      an electronic speed controller (ESC) comprising:
        a battery eliminator circuit (BEC) providing regulated power from a model vehicle battery comprising a model vehicle battery voltage; and
        an accessory port electrically coupled to the regulated power produced by the BEC;
      wherein an accessory device is electrically coupled to the ESC via an accessory connector coupled to the accessory device and the accessory port;
    wherein the accessory connector provides at least one of an accessory voltage or an accessory signal for operating the accessory device; and
    wherein the accessory voltage or the accessory signal provided from the regulated power produced by the BEC is different than the model vehicle battery voltage.

11. The model vehicle of claim 10, wherein the accessory device comprises two or more accessory devices, each comprising a unique identification (UID) message.

12. The model vehicle according to claim 10 wherein the accessory device is controlled via the accessory signals.

13. A method for making an electrical connection for a model vehicle comprising:
    providing an electronic speed controller (ESC) for the model vehicle, in which the ESC comprises:
      a battery eliminator circuit (BEC) providing regulated power from a model vehicle battery comprising a model vehicle battery voltage; and
      an accessory port electrically coupled to the regulated power produced by the BEC;
    electrically coupling an accessory device to the ESC via an accessory connector electrically coupled to the accessory device and the accessory port
    providing at least one of an accessory voltage or an accessory signal to the accessory device via the accessory connector;
    wherein the at least one of the accessory voltage or the accessory signal is provided for operation of the accessory device; and
    wherein the accessory voltage or the accessory signal provided from the regulated power produced by the BEC is different than the model vehicle battery voltage.

14. The method of claim 13 wherein the accessory device comprises two or more accessory devices independently controlled via the accessory signal.

15. The method of claim 13 wherein the accessory device is brake lights.

16. The method of claim 13 wherein the accessory device is a simulated sound emitter.

* * * * *